(12) United States Patent
El-Hibri et al.

(10) Patent No.: US 11,905,405 B2
(45) Date of Patent: Feb. 20, 2024

(54) POLYESTER COMPOSITIONS AND MOBILE ELECTRONIC DEVICE COMPONENTS MADE THEREFROM

(71) Applicant: SOLVAY SPECIALTY POLYMERS USA, LLC, Alpharetta, GA (US)

(72) Inventors: Mohammad Jamal El-Hibri, Atlanta, GA (US); Keshav S. Gautam, Suwanee, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 17/584,825

(22) Filed: Jan. 26, 2022

(65) Prior Publication Data

US 2022/0145070 A1    May 12, 2022

Related U.S. Application Data

(63) Continuation of application No. 15/757,925, filed as application No. PCT/EP2016/070322 on Aug. 29, 2016, now abandoned.

(60) Provisional application No. 62/216,107, filed on Sep. 9, 2015.

(30) Foreign Application Priority Data

Nov. 23, 2015 (EP) ..................... 15195867

(51) Int. Cl.
*C08L 67/02* (2006.01)
*C08K 3/22* (2006.01)
*C08L 51/06* (2006.01)

(52) U.S. Cl.
CPC ............. *C08L 67/02* (2013.01); *C08K 3/22* (2013.01); *C08L 51/06* (2013.01); *C08L 2203/20* (2013.01); *C08L 2205/025* (2013.01); *C08L 2205/03* (2013.01); *C08L 2205/035* (2013.01)

(58) Field of Classification Search
CPC .................. C08L 67/02; C08L 69/00
See application file for complete search history.

(56) References Cited

U.S. PATENT DOCUMENTS

| | | | |
|---|---|---|---|
| 4,753,980 A | 6/1988 | Deyrup | |
| 4,900,610 A * | 2/1990 | Hochberg | C08L 67/02 525/64 |
| 4,965,111 A | 10/1990 | Pratt et al. | |
| 5,424,361 A * | 6/1995 | De Rudder | C08L 69/00 524/424 |
| 5,436,294 A | 7/1995 | Desio et al. | |
| 5,447,980 A | 9/1995 | Reichmann | |
| 5,461,092 A | 10/1995 | Laughner | |
| 9,062,165 B2 | 6/2015 | Meller et al. | |
| 2007/0244227 A1 | 10/2007 | Eipper et al. | |
| 2008/0117576 A1 | 5/2008 | Gao et al. | |
| 2008/0239636 A1 | 10/2008 | Hsu et al. | |
| 2009/0318588 A1 | 12/2009 | Kim et al. | |
| 2010/0016518 A1 | 1/2010 | El-Hibri et al. | |
| 2010/0152358 A1 | 6/2010 | Jung et al. | |
| 2012/0184662 A1 | 7/2012 | Van der Mee et al. | |
| 2013/0286625 A1 | 10/2013 | Huang | |

FOREIGN PATENT DOCUMENTS

| | | |
|---|---|---|
| CN | 103849124 A | 6/2014 |
| DE | 102004038979 A1 | 2/2006 |
| EP | 329468 A2 | 8/1989 |
| EP | 1559748 A1 | 8/2005 |
| EP | 3158003 B1 | 11/2019 |
| KR | 2014-0034737 A | 3/2014 |
| WO | 2012116026 A1 | 8/2012 |
| WO | 2014195226 A1 | 12/2014 |
| WO | WO2015/125050 A1 | 8/2015 |
| WO | 2015200272 A2 | 12/2015 |

OTHER PUBLICATIONS

Standard ASTM D256, Historical 2005 Revision A, "Standard Test Methods for Determining the Izod Pendulum Impact Resistance of Plastics", p. 1-20.
Wei, J., "Thermoplastic Polyester And Its Applications", Beijing: Publishing House of Chemical Industry, 2011, pp.342-343.
Chen X. et al., "Effect of molecular weight on crystallization, melting behavior and morphology of poly(trimethylene terephalate)", Polymer Testing, 2007, vol. 26, pp. 144-153.
Falbe, J. et al., "Rompp Chemie Lexikon", 1995, E. 9, p. 3533, p. 3517, Georg Thieme Verlag Stuttgart—New York, inlcuding section entitled "polybutylene terephthalates" on p. 3517 and section entitled "polyethylene terephthalates" on p. 3533 translated in English.
Stevens M. P., "Polymer Chemistry: An introduction", 1990, Oxford University Press, p. 70, p. 94.
Wikipedia, "Sorona", extracted at https://en.wikipedia.org/wiki/Sorona on Nov. 13, 2020.
Wikipedia, "Polybutylene terephthalate", extracted at https://en.wikipedia.org/wiki/Polybutylene_terephthalate on Nov. 13, 2020.
Material Notes concerning Eastman Eastar PCTG 5445, extracted at http://www.matweb.com/search/datasheet_print.aspx?matguid=da355b7e6e8945218caa1657e5e53ce5.

* cited by examiner

Primary Examiner — Michael M Dollinger
(74) Attorney, Agent, or Firm — Beatrice C. Ortego

(57) ABSTRACT

Described herein are polymer compositions including at least one semi-crystalline, semi-aromatic polyester polymer and at least one impact modifier. The blends have excellent impact resistance and excellent dimensional stability. The blends also have excellent chemical resistance, whiteness, colorability and anodization resistance. The polymer compositions can optionally include at least one amorphous polymer. The at least one amorphous polymer can be an amorphous polycarbonate polymer or an amorphous polyester polymer or a polyester-carbonate. In some embodiments, the polymer composition can optionally include one or more additives. The polyester compositions described herein can be desirably incorporated into mobile electronic device components.

18 Claims, No Drawings

POLYESTER COMPOSITIONS AND MOBILE ELECTRONIC DEVICE COMPONENTS MADE THEREFROM

CROSS-REFERENCE TO RELATED APPLICATIONS

This application is a continuation application of U.S. application Ser. No. 15/757,925 filed on Mar. 6, 2018 which is the U.S. national stage entry under 35 U.S.C. § 371 of International Application No. PCT/EP2016/070322 filed Aug. 26, 2016, and which claims priority to U.S. provisional patent application No. 62/216,107, filed Sep. 9, 2015, and to European patent application No. 15195867.5, filed Nov. 23, 2015, the whole content of each of these applications being incorporated herein by reference for all purposes.

FIELD OF THE INVENTION

The invention relates to polyester compositions including a semi-crystalline, semi-aromatic polyester polymer and an impact modifier. The invention further relates to such polyester compositions further including at least one amorphous polycarbonate polymer or at least one amorphous polyester polymer. The also relates to mobile electronic device components made from the polyester compositions.

BACKGROUND OF THE INVENTION

Nowadays, mobile electronic devices such as mobile phones, personal digital assistants (PDAs), laptop computers, tablet computers, smart watches, portable audio players, and so on, are in widespread use around the world.

Mobile electronic devices are getting smaller and lighter for even more portability and convenience, while at the same time becoming increasingly capable of performing more advanced functions and services, both due to the development of the devices and network systems.

While in the past, low density metals such as magnesium or aluminum, were the materials of choice for mobile electronic parts, synthetic resins have progressively come as at least partial replacement, for costs reasons (some of these less dense metals such as magnesium are somewhat expensive, and manufacturing the often small and/or intricate parts needed is expensive), for overriding design flexibility limitations, for further weight reduction, and for providing un-restricted aesthetic possibilities, thanks to the colorability of the same. It is therefore desirable that plastic mobile electronic parts are made from materials that are easy to process into various and complex shapes, are able to withstand the rigors of frequent use, including outstanding impact resistance, generally possess electrical insulating capabilities, and which meet challenging aesthetic demands while not interfering with their intended operability.

Nevertheless, in certain cases, plastics may not have the strength and/or stiffness to provide for all-plastic structural parts in mobile electronic devices, and metal/synthetic resins assemblies are often encountered.

Providing polymeric compositions having desirable mechanical performance for ensuring structural support (tensile strength) and yet desirable flexibility for enabling mounting/assembling (e.g., elongation at break), able to withstand impact and aggressive chemicals (e.g., impact and chemical resistance, respectively), having good colorability, and which can be easily processed is a continuous challenge in this field, and while solutions based on a variety of plastics have already been attempted, still continuous improvements to reach unmet challenges are required.

DETAILED DESCRIPTION OF THE INVENTION

Described herein are polyester compositions including at least one semi-crystalline, semi-aromatic polyester polymer and at least one impact modifier. The blends have excellent impact resistance and excellent dimensional stability. The polyester compositions also have excellent chemical resistance, whiteness, colorability and anodization resistance. In some embodiments, it has been found that reactive impact modifiers containing both acrylic ester and glycidyl methacrylate moieties can significantly increase the impact performance of blends made therefrom. In some embodiments, the polyester compositions can further include at least one amorphous polymer. In such embodiments, the at least one amorphous polymer can be at least one amorphous polycarbonate polymer, at least one amorphous polyester polymer or a combination thereof. In some embodiments, the polyester compositions can optionally include one or more additives.

For the sake of clarity, throughout the present application:

the term "halogen" includes fluorine, chlorine, bromine and iodine, unless indicated otherwise;

the adjective "aromatic" denotes any mono- or polynuclear cyclic group (or moiety) having a number of $\pi$ electrons equal to $4n+2$, wherein n is 0 or any positive integer; an aromatic group (or moiety) can be an aryl and arylene groups (or moiety) moieties.

an "aryl group" or "aryl" is a hydrocarbon monovalent group consisting of one core composed of one benzenic ring or of a plurality of benzenic rings fused together by sharing two or more neighboring ring carbon atoms, and of one end. Non limitative examples of aryl groups are phenyl, naphthyl, anthryl, phenanthryl, tetracenyl, triphenylyl, pyrenyl, and perylenyl groups. The end of an aryl group is a free electron of a carbon atom contained in a (or the) benzenic ring of the aryl group, wherein an hydrogen atom linked to said carbon atom has been removed. The end of an aryl group is capable of forming a linkage with another chemical group.

an "arylene group" or "arylene" is a hydrocarbon divalent group consisting of one core composed of one benzenic ring or of a plurality of benzenic rings fused together by sharing two or more neighboring ring carbon atoms, and of two ends. Non limitative examples of arylene groups are phenylenes, naphthylenes, anthrylenes, phenanthrylenes, tetracenylenes, triphenylylenes, pyrenylenes, and perylenylenes. An end of an arylene group is a free electron of a carbon atom contained in a (or the) benzenic ring of the arylene group, wherein an hydrogen atom linked to said carbon atom has been removed. Each end of an arylene group is capable of forming a linkage with another chemical group.

the term "hydrocarbyl" as used herein means the monovalent moiety obtained upon removal of a hydrogen atom from a parent hydrocarbon. Representative of hydrocarbyl are alkyls of 1 to 25 carbon atoms, inclusive such as methyl, ethyl, propyl, butyl, pentyl, hexyl, heptyl, octyl, nonyl, undecyl, decyl, dodecyl, octadecyl, nonodecyl eicosyl, heneicosyl, docosyl, tricosyl, tetracosyl, pentacosyl and the isomeric forms thereof; aryls of 6 to 25 carbon atoms, inclusive, such as phenyl, tolyl, xylyl, napthyl, biphenyl, tetraphenyl and the like; aralkyls of 7 to 25 carbon atoms, inclusive, such as benzyl, phenethyl, phenpropyl, phenbutyl, phenhexyl, napthoctyl and the like; and cycloalkyls of 3 to 8 carbon atoms, inclusive, such as cyclopropyl, cyclobutyl, cyclopentyl, cyclohexyl, cycloheptyl, cyclooctyl and the like.

the term "halogen-substituted hydrocarbyl" as used herein means the hydrocarbyl moiety as previously defined wherein one or more hydrogen atoms have been replaced with halogen (chlorine, bromine, iodine, fluorine).

The polyester compositions have excellent impact performance and excellent dimensional stability. With respect to impact performance, while it is often desirable that mobile electronic devices (and parts thereof) be small and lightweight, excellent structural strength is highly desirable so that device will not be damaged in normal handling and occasional sudden impact (e.g. drops). Correspondingly, structural parts are generally built into mobile electronic devices that impart strength, rigidity, and/or impact resistance to the device, and possibly also provide mounting places for various internal components of the device and/or part or all of the mobile electronic device case (e.g., outer housing), while ensuring electrical insulation/electrical shield among components. With respect to dimensional stability, it has been surprisingly found that the polyester compositions described herein have significantly reduced warpage and shrinkage, despite the fact that they comprise a semi-crystalline polyester. Generally, toughened (e.g., impact modified) semi-crystalline or crystalline polyester compositions are typically used for their high impact resistance coupled with excellent chemical resistance. However, such polyester compositions can have reduced dimensional stability relative to amorphous polyester compositions. In particular, semi-crystalline and crystalline polymers generally have an average mold shrinkage of between 1.0% and 2.0%, where an average mold shrinkage of 1.0% or greater is considered a high shrinkage material. This reduced dimensional stability can make processing (e.g. injection molding) these materials difficult, especially in application settings where tolerances are relatively high (e.g. mobile electronic device components). It has been surprisingly found that the polyester compositions described herein can have an average mold shrinkage that is significantly less than 1.00% while also having relatively low shrinkage anisotropy (i.e. similar shrinkage amounts in the flow and transverse directions) and high impact resistance as well as chemical resistance, as described below.

In some embodiments, the polyester compositions can have an impact resistance of at least about 700 Joules/meter ("J/m"), at least about 800 J/m, at least about 850 J/m, at least 875 J/m, at least about 900 J/m, at least about 925 J/m, at least about 950 J/m, at least about 975 J/m or at least about 1,000 J/m. In some embodiments, the polyester compositions described herein can have an impact resistance of no more than about 5,000 J/m, no more than about 4,000 J/m, no more than about 3,500 J/m, no more than about 3,000 J/m, no more than about 2,500 J/m or no more than about 2,000 J/m. A person of ordinary skill in the art will recognize additional impact resistance ranges within the explicitly disclosed ranges are contemplated and within the scope of the present disclosure. Impact resistance can be measured using a notched Izod impact test according the ASTM D256 standard, as described further in the Examples.

In some embodiments, the polyester compositions can have an average mold shrinkage of from about 0.6% to about 0.99%, from about 0.6% to about 0.95%, from about 0.7% to about 0.95%, from about 0.75% to about 0.95%, or from about 0.8% to about 0.95%. In some embodiments, the polyester compositions can have an anisotropy of shrinkage of from about 0.7 to about 1.1, from about 0.75 to about 1.1, from about 0.8 to about 1.1, from about 0.8 to about 1, or from 0.86 to about 1 or from about 0.88 to about 1. The average mold shrinkage and anisotropy of shrinkage can be determined from the measured mold shrinkage in the flow direction ("MD") and the transverse direction ("TD"), as demonstrated in the examples below. A person of ordinary skill in the art will recognized additional ranges of average mold shrinkage and anisotropy of shrinkage within the explicitly disclosed ranges is contemplated and within the scope of the present disclosure.

The polyester compositions can also have excellent chemical resistance. In some application settings, at least a portion of a plastic component of a mobile electronic device can be exposed to the environment external to the mobile electronic device and, therefore, can come into contact with chemical agents in the external environment. For example, tablet computers, mobile phones and wearable computing devices are designed to interact with humans through physical contact and exposed plastic components thereof can be exposed to chemical agents from interacting body parts. Furthermore, regardless of whether a portion of the plastic component is exposed to the environment external to the mobile device, in some embodiments, it can still come into contact with chemical agents. For example, mobile electronic devices can be susceptible to accidental spills including, but not limited to, liquids which can penetrate a housing of a mobile electronic device through passageways therein. In general, the agents in the external environment that come into contact with a plastic device component include, but are not limited to, polar organic agents such as consumer chemical agents.

The resistance of a polyester composition to polar organic chemicals can be measured by its resistance to sunscreen lotion, which generally represents one of the harshest consumer chemicals a device component is expected to endure in its intended application setting. Sunscreen lotion generally contains a spectrum of ultraviolet absorbing chemicals that can be highly corrosive to plastic. A representative sunscreen can include at least 1.8 wt. % avobenzone (1-(4-methoxyphenyl)-3-(4-tert-butylphenyl)-1,3-propanedione), at least 7 wt. % homosalate (3,3,5-trimethylcyclohexyl salicylate) and at least 5 wt. % octocrylene (2-ethylhexyl 2-cyano-3,3-diphenylacrylate). An example of the aforementioned sunscreen is commercially available under the trade name Banana Boat® Sport Performance® (SPF 30) from Edgewell (St. Louis, MO). The chemical resistance of the polyester compositions can be measured as the lowest strain necessary to visually observe cracking or crazing in a molded sample of the composition after the sample is exposed to sunscreen lotion on a variable flexural strain fixture (commonly referred to as a "Bergen jig") and aged in a controlled environment ("critical strain"). In general, the higher the critical strain, the higher the chemical resistance of the polyester composition to polar organic agents. The polyester compositions of interest herein can have a critical strain of greater than about 2%. The measurement of critical strain is described further in the Examples below.

The polyester compositions can also have excellent whiteness. In some embodiments, the polyester compositions can have a CIE L* value of from about 90 to about 99, a CIE a* value from about −2 to about 2 and a CIE b* value from about −3 to about 3. In some embodiments, the polyester compositions can have a CIE L* value of from about 92 to about 99, a CIE a* value from about −0.5 to about 0.5, and a CIE b* from about −2 to about 2. A person of ordinary skill in the art will recognize additional L*, a* and b* ranges within the explicitly disclosed ranges are contemplated and within the scope of the present disclosure.

The polyester compositions described herein can also be highly colourable. Correspondingly, desirable color can be imparted to the compositions using a relatively modest amount of pigments. In general, increased pigment concentrations can undesirably reduce the impact performance of a polyester composition. Highly colourable polyester compositions are desirable, in part, because they can help to promote increased impact performance. In some embodiments, the total pigment concentration can be from about 0.5 parts per hundred resin ("phr") to about 20 phr, to about 15 phr, to about 10 phr or to about 5 phr. In some embodiments, the total pigment concentration can from 0.1 wt. % to about 20 wt. %, to about 15 wt. %, to about 10 wt. %, to about 5 wt % or to about 3 wt. %, relative to the total weight of the polyester compositions. A person of ordinary skill in the art will recognize additional total pigment concentration ranges within the explicitly disclosed ranges are contemplated and within the scope of the present disclosure.

The polyester compositions can also have excellent anodization resistance. Metal parts (e.g. aluminum parts) or metal-plastic composite parts (e.g., aluminum-plastic parts) present in mobile electronic devices often undergo anodization treatment. Anodization treatment can include electro chemical processes where the aim is to build an oxide layer on the metal surface, generally through the use of aggressive chemicals. Correspondingly, polymeric materials exhibiting excellent resistance to anodization bath environments are desirable in application settings in which anodization is performed on mobile electronic parts already containing or assembled to polymeric elements. Anodization resistance can be measured as the difference in tensile strength and elongation at break of an as molded sample of the polyester compositions and a molded sample that has been exposed to 70% wt. % sulfuric acid at 23° C. The measurement of the anodization resistance is further described in the Examples. In some embodiments, the polyester compositions can have a relative difference in tensile strength (100*|tensile strength exposed−tensile strength unexposed|/(tensile strength unexposed)) of no more than about 10%, no more than about 5%, no more than about 2%, no more than about 1.5%, or no more than about 1%. In some embodiments, the polyester compositions can have a relative difference in tensile modulus (100*|tensile modulus exposed−tensile modulus unexposed|/(tensile modulus unexposed)) of no more than about 10%, no more than about 5%, no more than about 2%, no more than about 1.5%, or no more than about 1%. In some embodiments, the polyester compositions can have a relative difference in tensile elongation at break (100*|tensile elongation exposed−tensile elongation unexposed|/(tensile elongation unexposed)) of no more than about 30%, no more than about 20%, no more than about 15%, or no more than about 12%. A person of ordinary skill in the art will recognize additional ranges of relative tensile strength, relative tensile modulus and relative tensile elongation at break within the explicitly disclosed ranges are contemplated and within the scope of the present disclosure.

The Semi-Aromatic, Semi-Crystalline Polyester Polymer

The polyester compositions of interest herein include at least one semi-aromatic semi-crystalline polyester polymer. Semi-crystalline polymers possess a glass transition temperature as well as a melting temperature. The semi-crystalline polyester can be a homopolymer or copolymer (random, alternating or block). As used herein, a "semi-aromatic polyester" polymer refers to a polymer including at least 50 mol % recurring units ($R_{pe}$) having at least one ester group (—C(O)O—), at least one alkylene group and at least one arylene group, where the arylene group contains at least 2 fused benzene rings having at least two carbons in common. In some embodiments, the semi-aromatic polyester has at least 60 mol %, at least 70 mol %, at least 80 mol %, at least 90 mol %, at least 95 mol %, or at least 99 mol % recurring units ($R_{pe}$). A person of ordinary skill in the art will recognize additional recurring units ($R_{pe}$) concentration ranges within the explicitly disclosed ranges are contemplated and within the scope of the present disclosure.

In some embodiments, recurring unit ($R_{pe}$) can be represented by one of the following formulae:

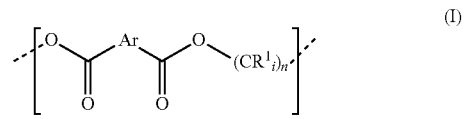

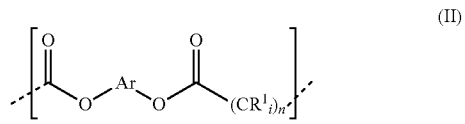

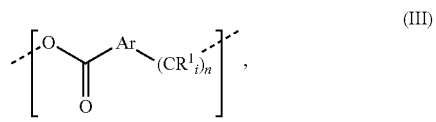

where Ar is an arylene group containing at least 2 fused benzene rings having at least two carbons in common; where $R^1$, at each instance, is independently selected from the group consisting of a halogen, an alky, an alkenyl, an aryl, a aryl, an ether, a thioether, an ester, an amide, an imide, an alkali or alkaline earth metal sulfonate, an alkyl sulfonate, an alkali or alkaline earth metal phosphonate, an alkyl phosphonate, an amine, an quaternary ammonium, and any combination thereof; where n is an integer from 1 to 20; and where i, at each instance, is an independently selected integer ranging from 0 to 2. As used herein, "independently selected" means that the corresponding units can be the same or different and are selected independently of each other.

In some embodiments, —$(CR^1_i)_n$— can be represented by the formula —$C_nH_{2n}$— (i=0 at each instance). In some such embodiments, the —$C_nH_{2n}$— can be a $C_2$-$C_8$ alkylene group, a linear $C_2$-$C_8$ alkylene group, or a linear $C_2$-$C_4$ alkylene group. Desirable —$C_nH_{2n}$— groups can include, but are not limited to, a methyl group; an ethyl group; an n-propyl group; an isopropyl group; or a butyl group (n-, iso, sec or tert).

In some embodiments, Ar can be selected from a naphthylene (e.g., 2,6-naphthylene), an anthrylene (e.g., 2,6-anthrylene), a phenanthrylenes (e.g., 2,7-phenanthrylene), a naphthacenylene and a pyrenylene. Particularly desirable semi-aromatic polyesters have recurring unit ($R_{pe}$) that is represented by Formula (I), where Ar is a napthalate represented by the following formula,

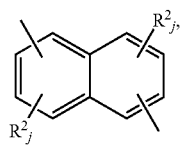

(IV)

where $R^2$, at each instance, is independently selected from the group consisting of a halogen, an alkyl, a perhalogenated alkyl, an alkenyl, a perhalogenated alkynyl, an aryl, a perhalogenated aryl, an ether, a thioether, an ester, an amide, an imide, an alkali or alkaline earth metal sulfonate, an alkyl sulfonate, an alkali or alkaline earth metal phosphonate, an alkyl phosphonate, an amine, an quaternary ammonium, and any combination thereof; and where j, at each instance, is an independently selected integer from 0 to 3. In some embodiments, Ar can be represented by the following formula:

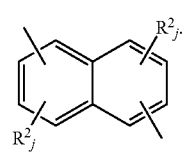

(V)

Examples of desirable units Ar include, but are not limited to, 2,6-napthalate; 2,7-napthalate; 1,4-napthalate; 2,3-napthalate; 1,8-napthalate; 1,2-napthalate; and derivatives thereof.

Desirable recurring units ($R_{pe}$) can include alkylene napthalates including, but not limited to, methylene naptha-late, ethylene napthalate, propylene napthalate and butylene napthalate. In such embodiments, the polyester can be a poly(methylene-2,6-napthalate), a poly(ethylene-2,6-napthalate), a poly(propylene-2,6-napthalate) or a poly(butylene-2,6-napthalate), respectively. Excellent results were obtained for poly(ethylene-2,6-napthalate) ("PEN").

The semi-aromatic polyesters of interest herein can be synthesized using techniques well known in the art. For example, the semi-aromatic polyesters of Formula (IV) can by formed from by polycondensation of the corresponding dicarboxylic acid of Ar:

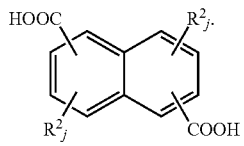

and the corresponding diol of —$(CR^1_i)_n$—: HO—$(CR^1_i)_n$—OH.

In addition to recurring unit ($R_{pe}$), the semi-crystalline polyester can include one or more additional recurring units ($R_{pe}*$) distinct from recurring unit ($R_{pe}$). Desirable recurring units ($R_{pe}*$) include, but are not limited to, those described above with respect to recurring units ($R_{pc}$). In some such embodiments, the semi-crystalline polyester can include no more than about 49 mol %, no more than about 40 mol %, no more than about 30 mol %, no more than about 20 mol %, no more than about 10 mol %, no more than about 5 mol %, or no more than about 1 mol % of the one or more additional recurring units ($R_{pe}*$). A person of ordinary skill in the art will recognize additional recurring unit ($R_{pe}*$) concentration ranges within the explicitly disclosed ranges are contemplated and within the scope of the present disclosure.

The semi-crystalline polyester can have a number average molecular weight of at least about 1,000 g/mol, at least about 5,000 g/mol, or at least about 10,000 g/mol. In some embodiments, the semi-crystalline polyester can have a number average molecular weight of no more than about 100,000 g/mol, no more than about 75,000 g/mol, or no more than about 50,000 g/mol. In some embodiments, the semi-crystalline polyester can have a weight average molecular weight of at least about 1,000 g/mol, at least about 15,000 g/mol or at least about 20,000 g/mol. In some embodiments, the semi-crystalline polyester can have a weight average molecular weight of no more than about 200,000 g/mol, no more than about 150,000 g/mol, no more than about 125,000 g/mol, no more than about 110,000 g/mol or no more than about 100,000 g/mol. A person of ordinary skill in the art will recognize additional ranges for number average and weight average molecular weights within the explicitly disclosed ranges are contemplated and within the scope of the present disclosure.

For the polyester compositions of interest herein, the concentration of the semi-crystalline polyester can be at least about 30 wt. %, at least about 40 wt. %, at least about 45 wt. %, at least about 50 wt. %, at least about 55 wt. % or at least about 60 wt. %, relative to the total weight of the polyester composition. In some embodiments, the concentration of the semi-crystalline polyester can be no more than about 90 wt. %, no more than about 85 wt. %, no more than about 80 wt. %, no more than about 75 wt. %, no more than about 70 wt. % or no more than about 65 wt. %, relative to the total weight of the polyester composition. In some embodiments, the concentration of the semi-crystalline polyester, relative to the combined weight of the amorphous polycarbonate and the amorphous polyester (weight semi-crystalline polyester/(weight amorphous polycarbonate+ weight amorphous polyester) can be from about 1 to about 30, from about 1 to about 25, from about 1 to about 15, from about 1 to about 10, from about 1.2 to about 10, from about 1.2 to about 5, from about 1.5 to about 5 or from about 1.5 to about 4. A person of ordinary skill in the art will recognize additional semi-crystalline polyester concentrations within the explicitly disclosed ranges are contemplated and within the scope of the present disclosure.

The degree of crystallinity of the semi-crystalline polyester can be characterized by its heat of fusion. The semi-crystalline polyester can have a heat of fusion of at least about 5 J/g, at least about 10 J/g, at least about 15 J/g, at least about 30 J/g, or at least about 35 J/g. In some embodiments, the semi-crystalline polyester can have a degree of crystallinity of at least about 10%, at least about 20%, at least about 30%, at least about 40%, at least about 50%, at least about 55% or at least about 60%. In some embodiments, the semi-crystalline polyester can have a degree of crystallinity of from about 10% to about 60%. A person of ordinary skill in the art will recognize additional ranges of heats of fusion and crystallinity within the explicitly disclosed ranges are contemplated and within the scope of the present disclosure. The degree of crystallinity can be measured using differential scanning calorimetry ("DSC"). In particular, DSC can be used to measure the heat of fusion of the semi-aromatic polyester and the degree of crystallinity can be determined as:

$$\text{crystallinity} = \frac{\Delta H_f^{(obs)}}{\Delta H_f^{(0)}} \times 100, \tag{img_1}$$

where $\Delta H_f^{(obs)}$ is the observed heat of fusion obtained by DSC and $\Delta H_f^{(0)}$ is the heat of fusion of the semi-crystalline polyester having 100% crystallinity. DSC can be performed on a sample of the polymer by heating the sample from room temperature to about 300° C., using a ramp rate of about 20°/min.

In some embodiments, the polyester composition can include one or more additional, distinct semi-crystalline polyesters. The additional, distinct semi-crystalline polyesters can include those semi-aromatic polyesters described above. In some embodiments, the weight ratio of the semi-crystalline polyester to the combined weight of the semi-crystalline polyester and the additional, distinct semi-crystalline polyesters (weight semi-crystalline polyester/(weight semi-crystalline polyester+weight additional, distinct semi-crystalline polyesters)) can be at least about 0.5, at least about 0.6, at least about 0.7, at least about 0.8, at least about 0.9, at least about 0.95, or at least about 0.99. In some embodiments, the weight ratio of the semi-crystalline polyester to the combined weight of the semi-crystalline polyester and the additional, distinct semi-crystalline polyesters can be 1. A person of ordinary skill in the art will recognize additional weight ratio ranges within the explicitly disclosed ranges are contemplated and within the scope of the present disclosure. In some embodiments, in which the polyester composition includes one or more additional, distinct semi-crystalline polyester polymers, the total semi-crystalline polymer concentration (semi-crystalline polyester+one or more additional, distinct semi-crystalline polyesters), relative to the total weight of the polyester composition, can be within the ranges described above with respect to the semi-crystalline polyester polymer. In other embodiments, the semi-crystalline polyester polymer concentration, relative to the total weight of the polyester composition, can be within the ranges described above and the one or more additional, distinct semi-crystalline polyester polymers can have independent concentrations.

The Amorphous Polycarbonate Polymer

The polyester compositions can optionally include an amorphous polycarbonate polymer. Amorphous polymers possess a glass transition temperature but lack a melting temperature. The amorphous polycarbonate polymer can be a homopolymer or copolymer (random, alternating or block). In some embodiments, the amorphous polycarbonate polymer is an aromatic polycarbonate polymer. As used herein, an "aromatic polycarbonate polymer" refers to any polymer in which at least 50 mol % of the recurring units are recurring units ($R_{pc}$) contain at least one arylene monomer and at least one carbonate monomer (—O—C(=O)—O—). In some embodiments, the amorphous polycarbonate polymer can have at least about 60 mol %, at least about 80 mol %, at least about 90 mol %, at least about 95 mol %, or at least about 99 mol % of the recurring unit ($R_{pc}$). A person of ordinary skill in the art will recognize additional ranges of recurring unit ($R_{pc}$) concentrations within the explicitly disclosed ranges is contemplated and within the scope of the present disclosure.

In some embodiments, the recurring ($R_{pc}$) can be represented by one the following formulae:

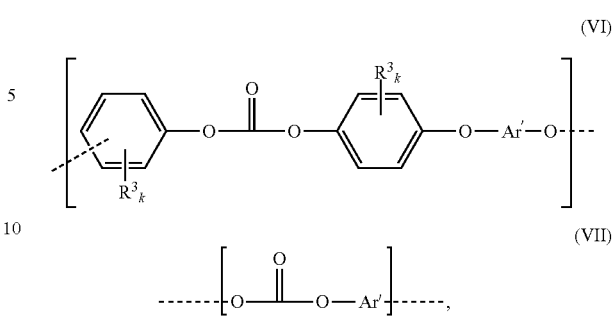

where $R^3$, at each instance, is independently selected from the group consisting of a halogen, a $C_1$-$C_{20}$ alkyl, a $C_5$-$C_{15}$ cycloalkyl, a $C_1$-$C_{20}$ alkenyl, an alkynyl, a $C_1$-$C_{20}$ aryl, a $C_1$-$C_{20}$ alkylaryl, a $C_1$-$C_{20}$ aralkyl, an ether, a thioether, carboxylic acid, an ester, an amide, an imide, an alkali or alkaline earth metal sulfonate, an alkyl sulfonate, an alkali or alkaline earth metal phosphonate, an alkyl phosphonate, an amine, a quaternary ammonium and any combination thereof; Ar' is an aromatic mono- or polynuclear group; and k, at each instance, is an independently selected integer ranging from 0 to 4.

In some embodiments, Ar' can be selected from a moiety containing one or more fused benzenic rings, including but not limited to naphthylenes (e.g., 2,6-naphthylene), anthrylenes (e.g., 2,6-anthrylene), phenanthrylenes (e.g., 2,7-phenanthrylene), naphthacenylenes and pyrenylenes; or a moiety containing an aromatic carbocyclic system including from 5 to 24 atoms, at least one of which is a heteroatom (e.g., pyridines, benzimidazoles, and quinolones). The hetero atom can be N, O, Si, P or S. In some embodiments, the hetero atom can be N, O or S.

In some embodiments, Ar' can be represented by one of the following formulae:

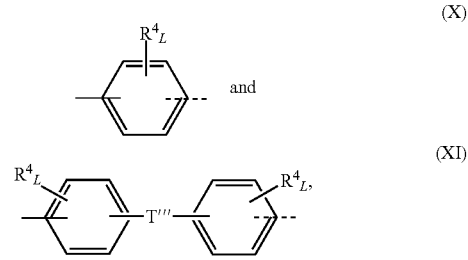

where $R^4$, at each instance, is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, amine, a quaternary ammonium and any combination thereof; where T''' is selected from a $C_1$-$C_{20}$ alkyl, a $C_5$-$C_{15}$ cycloalkyl, a $C_1$-$C_{20}$ aryl, a $C_1$-$C_{20}$ alkylaryl, a $C_1$-$C_{20}$ aralkyl, a $C_1$-$C_{20}$ alkenyl, and a halogen; and where L, at each instance, is an independently selected integer ranging from 0 to 4.

In some embodiments, the Ar' can be represented by the following formula:

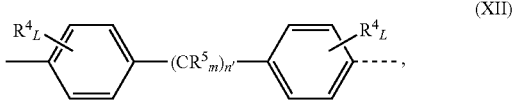

(XII)

where $R^5$, at each instance, is independently selected from the group consisting of a halogen, an alkyl, a perhalogenated alkyl, an alkenyl, a perhalogenated alkynyl, an aryl, a perhalogenated aryl, an ether, a thioether, an ester, an amide, an imide, an alkali or alkaline earth metal sulfonate, an alkyl sulfonate, an alkali or alkaline earth metal phosphonate, an alkyl phosphonate, an amine, an quaternary ammonium, and any combination thereof; where n' is an integer from 1 to 20; and where m, at each instance, is an independently selected integer ranging from 0 to 2. In some such embodiments, each $R^4$ can independently be a $C_1$-$C_{20}$ alkyl including, but not limited to, a methyl, an ethyl, an n-propyl; an isopropyl, or a butyl (n-, iso, sec or tert). In some embodiments, n' can be 1 and each m can be 2. In some such embodiments, each $R^4$ can be a methyl group.

The amorphous polycarbonate polymers can be synthesized by methods well known in the art. For example, amorphous polycarbonate polymers of Formula (VI) can be synthesized by polycondensation of a diphenyl carbonate monomer and an aromatic diol monomer. As a further example, amorphous polycarbonate polymers of Formula (VII) can be synthesized by the polycondensation of a phosgene monomer and an aromatic diol monomer. Desirable aromatic polycarbonate polymers and their corresponding syntheses are discussed in U.S. patent application publication number 2010/0016518 to El-Hibri et al., filed Feb. 26, 2009 and entitled "Aromatic Polycarbonate Composition," incorporated herein by reference.

In addition to recurring unit ($R_{pc}$), the amorphous polycarbonate polymer can include one or more additional recurring units ($R_{pc}$*) distinct from recurring unit ($R_{pc}$). Desirable recurring units ($R_{pc}$*) include, but are not limited to, those described above with respect to recurring unit ($R_{pc}$). In some embodiments recurring unit ($R_{pc}$*) can include those described above with respect to recurring unit ($R_{pe}$). In such embodiments, the amorphous polycarbonate is an amorphous polyester-carbonate. Desirable amorphous polyester-carbonates include, but are not limited to, those having recurring unit ($R_{pc}$*) formed from the polycondensation of a bisphenol A and a terephthalic acid or a isophthalic acid. Such recurring unit ($R_{pc}$*) can be represented by the following formula:

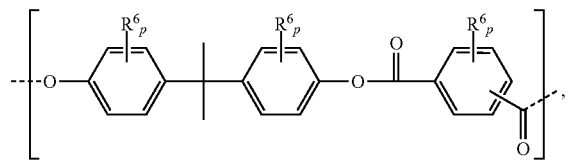

(XI)

where $R^6$, at each instance, is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, amine, a quaternary ammonium and any combination thereof; and p, at each instance, is an independently selected integer ranging from 1 to 4. In some embodiments, each p equals 0. In some embodiments, the amorphous polyester-carbonate can further include recurring unit ($R_{pc}$**) distinct from, and in addition to, recurring unit ($R_{pc}$*). In one such embodiment, the amorphous polyester-carbonate can have recurring units ($R_{pc}$*) and ($R_{pc}$**) respectively represented by the following formulae:

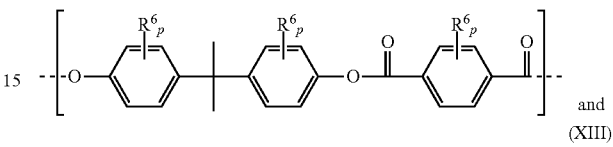

(XII)

and

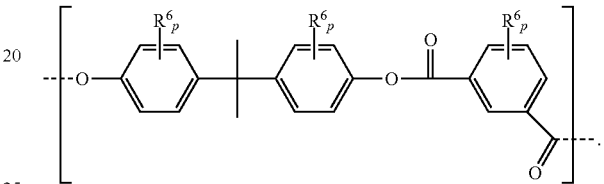

(XIII)

In some embodiments in which the aromatic polycarbonate includes one or more additional recurring units ($R_{pc}$*), the amorphous polycarbonate polymer can include at least about 1 mol %, at least about 10 mol %, at least about 20 mol %, at least about 30 mol %, at least about 40 mol % or at least about 50 mol. % of the one or more additional recurring units ($R_{pc}$*). A person of ordinary skill in the art will recognize additional recurring units ($R_{pc}$*) concentration ranges within the explicitly disclosed ranges are contemplated and within the scope of the present disclosure.

In some embodiments, the amorphous polycarbonate polymer concentration can be from about 1 wt. % to about 50 wt. %, from about 5 wt. % to about 50 wt. %, from about 10 wt. % to about 50 wt. %, from about 10 wt. % to about 45 wt. %, from about 10 wt. % to about 40 wt. %, from about 10 wt. % to about 35 wt. % or from about 15 wt. % to about 35 wt. %, relative to the total weight of the polyester composition. A person of ordinary skill in the art will recognize additional amorphous polycarbonate polymer concentrations within the explicitly disclosed ranges are contemplated and within the scope of the present disclosure.

In some embodiments, the polyester composition can include additional, distinct polycarbonate polymers. The additional, distinct polycarbonate polymers can include those polycarbonate polymers described above. In embodiments including one or more additional, distinct polycarbonate polymers, the weight ratio of the weight of the amorphous polycarbonate polymer to the combined weight of the amorphous polycarbonate polymer and the additional, distinct polycarbonate polymer (weight amorphous polycarbonate/(weight amorphous polycarbonate+total weight of additional polycarbonate polymer)) is at least about 0.5, at least about 0.6, at least about 0.7, at least about 0.8, at least about 0.9, at least about 0.95, or at least about 0.99. In some embodiments, the weight ratio of the amorphous polycarbonate polymer to the combined weight of the amorphous polycarbonate polymer and the additional, distinct polycarbonate polymer can be 1. A person of ordinary skill in the art will recognize additionally weight ratio ranges within the explicitly disclosed ranges are contemplated and within the scope of the present disclosure. In some embodiments, in which the polyester composition includes one or more additional, distinct polycarbonate polymers, the total polycarbonate polymer concentration (polycarbonate polymer+ one or more additional, distinct polycarbonate polymers), relative to the total weight of the polyester composition, can be within the ranges described in the preceding paragraph with respect to the amorphous polycarbonate polymer. In other embodiments, the amorphous polycarbonate polymer concentration, relative to the total weight of the polyester composition, can be within the ranges described in the preceding paragraph and the one or more additional, distinct polycarbonate polymers can have independent concentrations The Amorphous Polyester The polyester composition can include at least one amorphous polyester polymer. The amorphous polyester polymer can be a homopolymer or copolymer (random, alternating or block). In some embodiments, the amorphous polyester can be a copolyester. As used herein, a copolyester refers to a polymer having at least 2, distinct recurring units ($R_{pe1}$) and ($R_{pe2}$) with a combined concentration of at least 50 mol %, where each recurring unit ($R_{pe1}$) and ($R_{pe2}$) includes at least one ester group (—C(O)O—) and at least one cycloaliphatic group having from 1 to 20 carbon atoms. In some embodiments, the combined concentration of recurring units ($R_{pe1}$) and $R_{(pe2)}$ in the amorphous copolyester can be at least about 60 mol %, at least about 70 mol %, at least about 80 mol %, at least about 90 mol %, at least about 95 mol %, or at least about 99 mol %. A person of ordinary skill in the art will recognize additional combined concentration ranges of recurring units ($R_{pe1}$) and ($R_{pe2}$) within the explicitly disclosed ranges are contemplated and within the scope of the present disclosure.

In some embodiments, recurring units ($R_{pe1}$) and $R_{(pe2)}$ can be represented by the following two formulae, respectively: -[-Ma-Mb-]- and -[-Ma-Mc-]-, where Ma is a moiety including an aromatic dicarboxylate and Mb and Mc are independently selected from moieties including cycloaliphatic hydrocarbon groups. In some embodiments, -Ma- can be represented by the following formula:

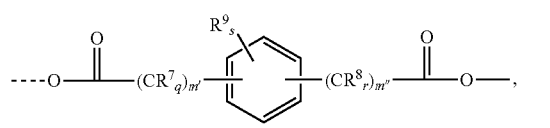

(XIV)

where $R^7$, $R^8$, and $R^9$, at each instance, are independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, a quaternary ammonium and any combination thereof; s is an integer ranging from 0 to 4; q and r, at each instance, are independently selected integers ranging from 0 to 2; and m' and m" are independently selected integers ranging from 0 to 20.

In some embodiments, -Ma- can be represented by the following formula:

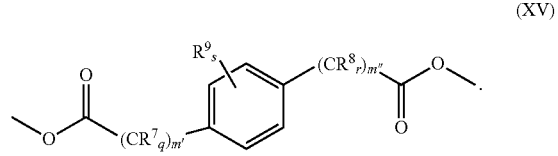

(XV)

In some embodiments, the group —($CR^7_q$)$_{m'}$— or —($CR^8_r$)$_{m''}$— (or both) can represented by the respective formulas —$C_{m'}$—$H_{2m'}$— and —$C_{m''}H_{2m''}$— (each q and each r equal 0). In some such embodiments, the $C_{m'}H_{2m'}$— (or —$C_{m''}H_{2m''}$—) can be a $C_2$-$C_8$ alkylene group, a linear $C_2$-$C_8$ alkylene group, or a linear $C_2$-$C_4$ alkylene group. Desirable —$C_mH^{2m'}$— (or —$C_{m''}H_{2m''}$—) groups can include, but are not limited to, a methyl group; an ethyl group; an n-propyl group; an isopropyl group; or a butyl group (n-, iso, sec or tert). In some embodiments, m' can be 0, m" can be zero, or m' and m" can be zero. In some such embodiments, s can be zero.

In some -Mb- and -Mc- can be independently represented by one of the following formulae:

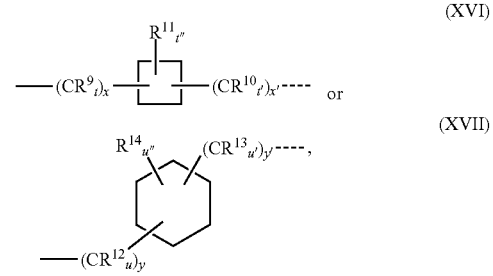

(XVI)

(XVII)

where $R^9$, $R^{10}$, $R^{11}$, $R^{12}$, $R^{13}$ and $R^{14}$, at each instance, is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, a quaternary ammonium and any combination thereof; t" is an integer from 0 to 6; u" is an integer from 0 to 10; t, t', u and u' are, at each instance, an independently selected integers ranging from 0 to 2; and x, x', y and y' are independently selected integers ranging from 0 to 20. In some embodiments, -Mb- and -Mc- can independently be represented by one of the following formulae:

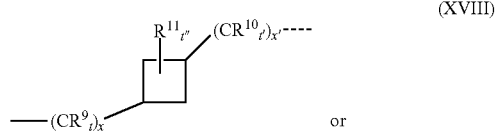

(XVIII)

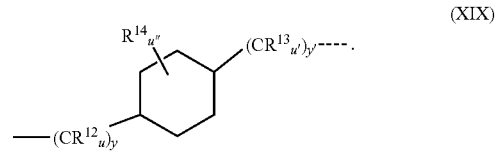

(XIX)

In some embodiments, any, some or all of the groups —($CR^9_t$)$_x$—, —($CR^{10}_{t'}$)$_{x'}$—, —($CR^{12}_u$)$_y$—, and —($CR^{13}_{t'}$)$_{y'}$— can be independently represented by the formula $C_zH_{2z}$, where z is x, x', y and y', respectively. In some such embodiments, the —$C_zH_z$— can be a $C_2$-$C_8$ alkylene group, a linear $C_2$-$C_8$ alkylene group, or a linear $C_2$-$C_4$ alkylene group. Desirable $C_zH_{2z}$ groups can include, but are not limited to, a methyl group; an ethyl group; an n-propyl group; an isopropyl group; or a butyl group (n-, iso, sec or tert). In some embodiments, —$(CR^{12}_t)_y$—, and —$(CR^{13}_{t'})_{y'}$— can both be a $CH_2$ group. In some such embodiments, u" can be 0. In some embodiments, t and t' can both be 0. In some such embodiments, t" can be 4 and $R^{11}$, at each instance, can be a ($CH_3$) group (e.g. Formula (XVIII) can represent a 2,2,4,4,-tretramethylcyclobutyl group).

In some embodiments, the amorphous polyester can have one or more additional recurring units ($R_{pe}*$) distinct from recurring units ($R_{pe2}$) and ($R_{pe3}$). Desirable recurring units ($R_{pe}*$) include, but are not limited to, those described above with respect to recurring units ($R_{pe2}$) and ($R_{pe3}$). In some such embodiments, the amorphous polyester can include no more than about 49 mol %, no more than about 40 mol %, no more than about 30 mol %, no more than about 20 mol %, no more than about 10 mol %, no more than about 5 mol %, or no more than about 1 mol % of the one or more additional recurring units ($R_{pe}*$). A person of ordinary skill in the art will recognize additional recurring unit ($R_{pe}*$) concentration ranges within the explicitly disclosed ranges are contemplated and within the scope of the present disclosure.

In some embodiments, the amorphous copolyester concentration can be from about 1 wt. % to about 50 wt. %, from about 5 wt. % to about 50 wt. %, from about 10 wt. % to about 50 wt. %, from about 10 wt. % to about 45 wt. %, from about 10 wt. % to about 40 wt. %, from about 10 wt. % to about 35 wt. % or from about 15 wt. % to about 35 wt. %, relative to the total weight of the polyester composition. A person of ordinary skill in the art will recognize additional amorphous copolyester polymer concentrations within the explicitly disclosed ranges are contemplated and within the scope of the present disclosure.

In some embodiments, the polyester compositions can include one or more additional, distinct polyesters. The additional, distinct polyesters can include, but are not limited to, those copolyesters described above. In embodiments including additional, distinct polyester polymers, the weight ratio of the weight of the amorphous polyester polymer to the combined weight of the amorphous polyester polymer and the additional, distinct polyester polymers (weight amorphous polyester/(weight amorphous polyester+total weight of additional, distinct polyesters)) is at least about 0.5, at least about 0.6, at least about 0.7, at least about 0.8, at least about 0.9, at least about 0.95, or at least about 0.99. In some embodiments, the weight ratio of the amorphous polyester polymer to the combined weight of the amorphous polyester polymer and the additional, distinct polyester polymers can be 1. In some embodiments in which the PE/PA blends include additional distinct polyester polymers, the total concentration of the polyester polymers (amorphous polyester+additional, distinct polyesters), relative to the total weight of the polyester composition, can be as described in the above with respect to the amorphous polyester polymer. In other embodiments, the concentration of the amorphous polyester polymer, relative to the total weight of the polyester composition, is within the ranges given above, and the one or more additional, distinct polyester polymers can have independent concentrations. A person of ordinary skill in the art will recognize additionally weight ratio ranges within the explicitly disclosed ranges are contemplated and within the scope of the present disclosure.

The Impact Modifier

The polyester compositions of interest herein include at least one impact modifier. In general, the impact modifier can be selected to impart useful properties to the polyester compositions, such as desirable tensile elongation at yield and break. In some embodiments, a rubbery low-modulus functionalized polyolefin impact modifier with a glass transition temperature ("Tg") lower than 0° C. is desirable. Functionalized polyolefin impact modifiers having a Tg<0° C. include, but are not limited to, those disclosed in U.S. Pat. No. 5,436,294 to Desio et al., filed Mar. 3, 1994 and entitled "Polyphthalamide Blends," and U.S. Pat. No. 5,447,980 to Reichmann, filed Sep. 16, 1993 and entitled "Stabilized Polyamide Fiber," both of which are incorporated herein by reference. Additionally, desirable impact modifiers include, but are not limited to, polyolefins, preferably functionalized polyolefins, and especially elastomers containing functionalized ethylene copolymers, including but not limited to, styrene ethylene butylene styrene ("SEBS") and ethylene propylene diene monomer (M-class) rubber ("EPDM").

Functionalized polyolefin impact modifiers are available from commercial sources, including maleated polypropylenes and ethylene-propylene copolymers available as Exxelor® PO and maleic anhydride-functionalized ethylene-propylene copolymer rubber comprising about 0.6 weight percent pendant succinic anhydride groups, such as Exxelor® RTM. VA 1801 from the Exxon Mobil Chemical Company; acrylate-modified polyethylenes available as Surlyn®, such as Surlyn® 9920, methacrylic acid-modified polyethylene from the DuPont Company; and Primacor®, such as Primacor® 1410 XT, acrylic acid-modified polyethylene, from the Dow Chemical Company; maleic anhydride-modified SEBS block copolymer, such as Kraton® FG1901X, a SEBS that has been grafted with about 2 weight % maleic anhydride, available from Kraton Polymers; maleic anhydride-functionalized EPDM terpolymer rubber, such as Royaltuf® 498, a 1% maleic anhydride functionalized EPDM, available from the Crompton Corporation. Suitable functional groups on the impact modifier include chemical moieties that can react with end groups of the semi-crystalline polyester and/or amorphous polyester to provide enhanced adhesion to the matrix polymer(s).

Other desirable functionalized impact modifiers include, but are not limited to, ethylene-higher alpha-olefin polymers and ethylene-higher alpha-olefin-diene polymers that have been provided with reactive functionality by being grafted or copolymerized with suitable reactive carboxylic acids or their derivatives such as, for example, acrylic acid, methacrylic acid, maleic anhydride or their esters, and will have a tensile modulus up to about 50,000 psi determined according to ASTM D-638. Suitable higher alpha-olefins include, but are not limited to, C3 to C8 alpha-olefins such as, for example, propylene, 1-butene, 1-hexene and styrene. Alternatively, copolymers having structures comprising such units may also be obtained by hydrogenation of suitable homopolymers and copolymers of polymerized 1-3 diene monomers. For example, polybutadienes having varying levels of pendant vinyl units are readily obtained, and these may be hydrogenated to provide ethylene-butene copolymer structures. Similarly, hydrogenation of polyisoprenes may be employed to provide equivalent ethylene-isobutylene copolymers.

In some embodiments, it has been found that reactive impact modifiers containing acrylic ester moieties and glycidyl methacrylate moieties can significantly improve the impact performance of the polyester compositions made therefrom. An example of the aforementioned reactive impact modifier is commercially available from Arkema (Bristol, PA, USA) under the trade name Lotader® AX8900, which is a terpolymer of ethylene, acrylic ester and glycidyl methacrylate. Another example of the aforementioned reactive impact modifier is commercially available from The Dow Chemical Company (Midland, MI, USA) under the trade name Paraloid EXL™ 2314, which is a core-shell type acrylate based impact modifier comprised of a core primarily comprised of cross-linked poly(n-butyl acrylate) rubber and having a shell phase comprised primarily of a poly(methyl methacrylate)-poly(glycidyl methacrylate) copolymer. In some embodiments, the reactive impact modifier can have an acrylic ester concentration from about 10 mol % to about 40 mol % and/or a glycidyl methacrylate concentration of from about 4 mol % to about 20 mol %. A person of ordinary skill in the art will recognize additional acrylic ester moiety concentration ranges within the explicitly disclosed ranges are contemplated and within the scope of the present disclosure.

The polyester compositions of interest herein have an impact modifier concentration of from about 1 wt. % to about 40 wt. %, from about 5 wt. % to about 40 wt. %, from about 5 wt. % to about 30 wt. %, from about 5 wt. % to about 25 wt. %, or from about 10 wt. % to about 25 wt. %, relative to the total weight of the polyester composition. A person of ordinary skill in the art will recognize additional impact modifier concentrations within the explicitly disclosed concentrations are contemplated and within the scope of the present disclosure.

In some embodiments, the polyester compositions can include on ore more additional, distinct impact modifiers. In such embodiments, the total concentration of the impact modifiers (impact modifier+additional, distinct impact modifiers), relative to the total weight of the polyester composition, can be as described in the above with respect to the impact modifier. In other embodiments, the concentration of the impact modifier relative to the total weight of the polyester composition is within the ranges given above and the one or more additional, distinct impact modifiers can have independent concentrations. A person of ordinary skill in the art will recognize additional impact modifier weight ratio and concentration ranges within the explicitly disclosed ranges are contemplated and within the scope of the present disclosure.

The Additives

In some embodiments, the polyester compositions can optionally include one or more additives. Additives can include, but are not limited to, ultraviolet ("UV") light stabilizers, heat stabilizers, antioxidants, pigments, processing aids (e.g. melt stabilizers), lubricants, flame retardants (halogen containing or halogen free), and/or a conductivity additive including, but not limited to, carbon black and carbon nano fibrils.

With respect to pigments, pigments for whiteness can include, but are not limited to, $TiO_2$, zinc sulphide, barium sulphate, calcium carbonate, and any combination thereof. Additionally any of a broad range of chromatic organic and/or inorganic pigments can be used to appropriately tune the color to the desired target. Some Examples of commercially available pigments include, but are not limited to, $Fe_2O_3$ (red) commercially available as Bayferrox® 140 M from LANXESS Corporation (Pittsburgh, PA); and lapis lazuli (blue) commercially available as Ultramarine Blue 5005 from Brenntag Specialties (South Plainfield, NJ).

With respect to melt stabilizers, in some embodiments, the melt stabilizer can include an organic phosphorous containing melt stabilizer. In such embodiments, desirable melt stabilizers can include, but are not limited to, those of the phosphite or phosphonite family or mixtures thereof. Desirable phosphites include, but are not limited to, mono and dialkyl substituted aromatic phosphites.

In certain embodiments, the phosphites can include di-t-butyl substituted aromatic phosphites, including, but not limited to, tris(2,4di-t-butyl-phenyl) phosphite. In some embodiments, desirable phosphites include, but are not limited to, those containing a pentaerythritol moiety. In such embodiments, the phosphites can include, but not limited to, bis(2,4-di-t-butylphenyl)pentaerythritol diphosphite, distearyl pentaerythritol diphosphite, and bis(2,4-dicumylphenyl) pentaerythritol diphosphite. Aromatic phosphonites can also be desirable in some embodiments, including, but not limited to, aromatic mono and diphosphonites. A particularly desirable phosphonite is tetrakis(2,4di-tert-butylphenyl)[1,1-biphenyl]-4,4'-diylbisphosphonite. In some embodiments, the aforementioned phosphonite can be used in combination with a phosphite described above. In some such embodiments, the phosphite used in combination with the phosphonite is tris(2,4t-butylphenyl)phosphite. In such mixtures the phosphonite is preferred to be the major component and the phosphite the minor one. A stabilizer composition which fits this description is sold commercially under the trademark Hostanox® P-EPQ®, available from Clariant Corporation (Charlotte, NC). In some embodiments, the melt stabilizer can have a concentration of about 0.1 wt. % up to about 0.3 wt. %, about 0.5 wt. %, about 0.7 wt. % or about 1 wt. %, relative to the total weight of the polyester composition.

Desirable UV stabilizers include, but are not limited to, hindered amine light stabilizers ("HALS") and other UV absorbing additives. HALS include, but are not limited to, bis(2,2,6,6-tetramethyl piperidin-4-yl)sebacate, bis(1,2,2,6,6-pentamethylpiperidin-4-yl)sebacate, di(1,2,2,6,6-pentamethylpiperidin-4-yl) (3,5-di-tert-butyl-4-hydroxybenzyl) butylmalonate, 4-benzoyl-2,2,6,6-tetramethylpiperidine, 4-stearyloxy-2,2,6,6-tetramethylpiperidine, 3-n-octyl-7,7,9,9-tetramethyl-1,3,8-triaza-spiro[4.5]decane-2,4-dione, tris (2,2,6,6-tetramethylpiperidin-4-yl) nitrilotriacetate, 1,2-bis (2,2,6,6-tetramethyl-3-oxopiperazin-4-yl)ethane, 2,2,4,4-tetramethyl-7-oxa-3,20-diaza-21-oxodispiro[5.1.11.2] heneicosane, polycondensation product of 2,4-dichloro-6-tert-octylamino-s-triazine and 4,4'-hexamethylenebis (amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis-(amino-2,2,6,6-tetra-methylpiperidine) and 1,2-dibromoethane, tetrakis(2,2,6,6-tetramethylpiperidin-4-yl)1,2,3,4-butanetetracarboxylate-, tetrakis(1,2,2,6,6-pentamethylpiperidin-4-yl)1,2,3,4-butanetetracarboxylate, polycondensation product of 2,4-dichloro-6-morpholino-s-triazine and 4,4'-hexamethylenebis (amino-2,2,6,6-tetramethylpiperidine), N,N',N'',N'''-tetrakis [(4,6-bis(butyl-1,2,2,6,6-pentamethyl-piperidin-4-y-1)-amino-s-triazin-2-yl]-1,10-diamino-4,7-diazadecane, mixed [2,2,6,6-tetramethylpiperidin-4-yl/β,β,β',β'-tetramethyl-3,9-(2,4,8,10-tetraoxaspiro[5.5]-undecane)diethyl]1,2,3,4-butanetetracarboxylate, mixed [1,2,2,6,6-pentamethyl piperidin-4-yl/β,β,β',β'-tetramethyl-3,9-(2,4,8,10-tetraoxaspiro[5.5]-undecane)diethyl]1,2,3,4-butanetetr-acarboxylate, octamethylene bis(2,2,6,6-tetramethyl-piperidin-4-carboxylate), 4,4'-ethylenebis(2,2,6,6-tetramethylpiperazin-3-one), N-2,2,6,6-tetramethyl-piperidin-4-yl-n-dodecylsuccinimide, N-1,2,2,6,6-pentamethyl-piperidin-4-yl-n-do decylsuccinimide, N-1-acetyl-2,2,6,6-tetramethylpiperidin-4-yl-n-dodecylsuccinimide, 1-acetyl3-dodecyl-7,7,9,9-tetramethyl-1,3,8-triazaspiro[4.5]decane-2,4-di-one, di-(1-octyloxy-2,2,6,6-tetramethyl piperidin-4-yl)sebacate, di-(1-cyclohexyloxy-2,2,6,6-tetra-methylpiperidin-4-yl) succinate, 1-octyloxy-2,2,6,6-tetramethyl-4-hydroxy-piperidine, poly-{[6-tert-octylamino-s-triazin-2,4-diyl][2-(1-cyclohexyloxy-2,2,6,6-t-etramethylpiperidin-4-yl)imino-hexamethylene-[4-(1-cyclohexyloxy-2,2,6,6-tetramethylpiperidin-4-yl)imino], and 2,4,6-tris[N-(1-cyclohexyloxy-2,2,6,6-tetramethylpiperidin-4-yl)-n-butylamino]-s-triazine.

Desirable antioxidants include, but are not limited to hindered phenols and hindered phosphites, for example, bis(2,4-di-t-butylphenyl)pentaerythritol diphosphate and bis (2,6-di-t-butyl-4-methylphenyl)pentaerythritol diphosphate.

Articles

The polyester compositions described herein can be desirably incorporated into a mobile electronic device component in a mobile electronic device. As used herein, a "mobile electronic device" refers to an electronic device that is intended to be conveniently transported and used in various locations. A mobile electronic device can include, but is not limited to, a mobile phone, a personal digital assistant ("PDA"), a laptop computer, a tablet computer, a wearable computing device (e.g., a smart watch and smart glasses), a camera, a portable audio player, a portable radio, a global positioning system receiver, and portable game console. For clarity, reference to "device component(s)" includes a reference to "mobile electronic device component(s)," unless explicitly stated otherwise.

For the device components of interest herein, at least a portion of the device component comprises the polyester composition. In some such embodiments, the device component consists essentially of the polyester composition. In some embodiments, the device component includes a metal portion and a portion fabricated from polyester compositions described herein.

In some embodiments, at least a portion of the device component can be exposed to the external environment of the mobile electronic device (e.g., at least a portion of the device component is in contact with the environment external to the mobile electronic device). For example, at least a portion of the device component can form at least a portion of the external housing of the mobile electronic device. In some such embodiments, the component can be a full or partial "frame" around the periphery of the mobile electronic device, a beam in the form of a lattice work, or a combination thereof. As another example, at least a portion of the device component can form at least a portion of an input device. In some such embodiments, a button of the electronic device can include the device component. In some embodiments, the device component can be fully enclosed by the electronic device (e.g., the component is not visible from an observation point external to the mobile electronic device).

In some embodiments, the device component can include a mounting component with mounting holes or other fastening device, including but not limited to, a snap fit connector between itself and another component of the mobile electronic device, including but not limited to, a circuit board, a microphone, a speaker, a display, a battery, a cover, a housing, an electrical or electronic connector, a hinge, a radio antenna, a switch, or a switchpad. In some embodiments, the mobile electronic device can be at least a portion of an input device The components of the mobile electronic device can be fabricated using methods well known in the art. For example, the device components can be fabricated by methods including, but not limited to, molding (e.g., injection molding, blow molding or extrusion molding). In some embodiments, the polyester compositions can be formed into pellets (e.g., having a substantially cylindrical body between two ends) by methods known in the art including, but not limited to, injection molding. In some such embodiments, device components can be fabricated from the pellets as described above.

In some embodiments, the device components can be coated with metal by methods well known in the art, including but not limited to, vacuum deposition (including various methods of heating the metal to be deposited), electroless plating, electroplating, chemical vapor deposition, metal sputtering, and electron beam deposition. Although the metal may adhere well to the components without any special treatment, in some embodiments, methods well known in the art can be used to improve adhesion. Such methods include, but are not limited to, abrasion to roughen the synthetic resin surface, addition of adhesion promotion agents, chemical etching, functionalization of the surface by exposure to plasma and/or radiation (for instance laser or UV radiation) or any combination of these. Also, in some embodiments, metal coating methods can include at least one step where the mobile electronic device component is immersed in an acid bath. More than one metal or metal alloy can be plated onto the components containing the polyester composition. For example, one metal or alloy can be plated directly onto the synthetic resin surface because of its good adhesion, and another metal or alloy can be plated on top of the previous plating because it has a higher strength and/or stiffness. Useful coating metals and alloys include, but are not limited to, copper, nickel, iron-nickel, cobalt, cobalt-nickel, and chromium, and combinations of these in distinct layers. In some embodiments, the surface of the mobile electronic device component can be fully or partially coated with metal. In some embodiments, more than about 50% or about 100% of the surface area of the component can be metal coated. In different areas of the component the thickness and/or the number of metal layers, and/or the composition of the metal layers may vary. The metal may be coated in patterns to efficiently improve one or more properties in certain sections of the mobile electronic device component.

EXAMPLES

The following examples demonstrate the mechanical and chemical properties of selected polyester compositions according to this invention. Each sample tested included a PEN polymer (semi-aromatic polyester) which is commercially available under the trade name Teonex® TN-8065S from Teijin Limited (Tokyo, JP). Each sample also included an impact modifier selected from the following: Lotader® AX8900 ("IM 1"), Lotader® AX8840 ("IM 2") or Paraloid® EXL-3361 ("IM 3"). Lotader® AX8900 and Lotader® AX8840 are both commercially available from Arkema (Bristol, PA, USA). Lotader® AX8900 is a terpolymer containing ethylene, acrylic ester and glycidyl methacrylate moieties while Lotader AX8840 is a copolymer of ethylene and glycidyl methacrylate (and free of acrylic ester moieties). Paraloid® EXL-3361 is a butyl acrylate and methyl methacrylate-based impact modifier which is free of glycidyl methacrylate moieties and is commercially available from The Dow Chemical Company (Midland, MI, USA). Each sample further included a white pigment. The white pigment used was TiPure® R-105 ($TiO_2$), commercially available from DuPont (Wilmington, DE, USA). Each sample further included either the amorphous polycarbonate polymer Makrolon® 3018, commercially available from Bayer Material Science, Inc. (Pittsburgh, PA, USA), or the amorphous copolyester polymer Tritan TX1000, commercially available from Eastman Chemical Company (Kingsport, TN). Table 1 displays the compositions of the samples tested.

TABLE 1

| Sample No. | E5 | E1 | CE2 | E2 | E3 | CE3 | E4 |
|---|---|---|---|---|---|---|---|
| PEN/Amorphous Polymer (wt/wt) | 100/0 | 75/25 | 75/25 | 65/35 | 65/35 | 65/35 | 65/35 |
| PEN (wt %) | 83.0 | 62.25 | 62.25 | 54.0 | 54.0 | 56.5 | 56.0 |
| Polycarbonate Polymer (wt. %) | — | 20.5 | 20.5 | — | 29.0 | — | — |
| Copolyester Polymer (wt. %) | — | — | — | 29.0 | — | 30.5 | 30.5 |
| IM 1 (wt %) | 17.0 | 17.0 | — | 17.0 | 17.0 | — | 13.0 |
| IM 2 (wt %) | — | — | — | — | — | 13.0 | — |
| IM 3 (phr) | — | — | 17.0 | — | — | — | — |
| $TiO_2$ 2 (phr) | 2.0 | 2.0 | 2.0 | 2.0 | 2.0 | 2.0 | 2.0 |

For mechanical and chemical testing, each of the blends was pelletized and subsequently extruded to form test specimens. Prior to pelletization, the PEN, polycarbonate and/or copolyester polyester of the blends were dried for at least 16 hours at a temperature of 175° C. and subsequently blended together with the corresponding impact modifier and white pigment. The resulting formulations were then melt compounded using a Coperion® ZSK-26 extruder to form pellets. Three types of test specimens, each having a thickness of about 0.125 in., were formed from pellets of each blend by injection molding: (A) ASTM D-638 Type I tensile bars; (B) 5 in.×0.5 in.×0.125 in. flexural bars; and (C) 4 in.×4 in.×0.125 in. plaques.

Example 1—Mechanical Performance

This Example 1 demonstrates the mechanical performance of PEN/amorphous polyester compositions. In particular, this Example 1 demonstrates the tensile properties and impact performance of the polyester compositions of this disclosure.

To demonstrate mechanical performance, the tensile properties (tensile strength at break, tensile modulus and tensile elongation at break) were measured according to the ASTM D-638 standard using type (A) test specimens and Notched Izod impact resistances were measured according to ASTM D-256 on a Type (B) test specimen machined to meet the dimensional requirements of the ASTM D-256 specification. The results of the mechanical testing are displayed in Table 2, below:

In Table 2, "D" indicates a ductile break type and "B" indicates a brittle break type. Also, in Table 2, "MD" indicates machine or flow direction and "TD" indicates Transverse or cross flow direction.

Table 2 demonstrates that test specimens prepared from a PEN or corresponding polymer blend had excellent impact performance while also having dimensional stability. Referring to Table 2, samples E1 to E5 all had notched Izod impact resistances of greater than about 929 J/m. Additionally, samples E1, E2 and E5 all had excellent dimensional stability as evidenced by the average mold shrinkages of between 0.88 and 0.94. The shrinkage of the blended samples (E1 and E2) were slightly more uniform relative to the sample containing only the PEN polymer (E5), as evidenced by the anisotropies of 0.88, 0.88 and 0.85, respectively.

Table 2 also surprisingly demonstrates that reactive impact modifiers having both acrylic ester and glycidyl methacrylate moieties provide significant improvement to the impact resistance of the polyester compositions. Referring to Tables 1 and 2, E1 (having an impact modifier containing acrylic ester and glycidyl methacrylate moieties) had an impact resistance of about 988 J/m while CE2 (having an impact modifier containing acrylic ester moieties but free of glycidyl methacrylate moieties) had an impact resistance of about 158 J/m. Similarly, E4 (having an impact modifier containing acrylic ester and glycidyl methacrylate moieties) gave an impact resistance of about 929 J/m while CE3 (having an impact modifier containing glycidyl methacrylate moieties but free of acrylic ester moieties) yielded an impact resistance of about 233 J/m.

Example 2—Chemical Performance

This Example 2 demonstrates the chemical performance of polymer compositions. In particular, this Example 2 demonstrates the whiteness, color stability, chemical resistance, and anodization resistance of polymer compositions.

The whiteness of the test specimens were demonstrated according to the CIE L-a-b coordinates standard, where the L* coordinate represents the lightness (black to white) scale, the a* coordinate represents the green-red chromaticity and the b* scale represents the blue-yellow chromaticity. The whiteness of a test-specimen was considered acceptable if the L* value was greater than 90.0 and the combined absolute values of the chromaticity coordinates a* and b* (|a*|+|b*|) were less than 4.0 units. Chemical resistance was demonstrated relative to sunscreen. Chemical resistance against sunscreen cream was tested by applying Banana Boat® SPF30 broad spectrum sunscreen cream to type (B) test specimens that were mounted onto a Bergen parabolic variable strain flexural jig, which varied the applied strain on the plastic material from about zero to about 2.0%, to form

TABLE 2

| Example No. | E5 | E1 | CE2 | E2 | E3 | CE3 | E4 |
|---|---|---|---|---|---|---|---|
| Tensile strength (MPa) | 49.3 | 48.0 | 55.0 | 49.2 | 50.8 | 45.2 | 44.8 |
| Tensile Modulus (GPa) | 1.69 | 1.69 | 1.98 | 1.40 | 1.62 | 1.62 | 1.47 |
| Tensile Elongation at Break (%) | 110 | 125 | 103 | 160 | 110 | 110 | 110 |
| Notched Izod Impact (J/m) | 1145 | 988 | 158 | 1186 | 983 | 233 | 929 |
| Break Type | D | D | B | D | D | B | D |
| Mold Shrinkage MD (%) | 0.86 | 0.86 | | 0.83 | | | |
| Mold Shrinkage TD (%) | 1.02 | 0.98 | | 0.94 | | | |
| Average Mold Shrinkage ((MD + TD)/2) | 0.94 | 0.92 | | 0.88 | | | |
| Anisotropy of Shrinkage (TD/MD) | 0.85 | 0.88 | | 0.88 | | | | stressed assemblies. As used herein, x % applied strain is the strain required to elongate the molded sample of the PPSU/PE blend by x %. For example, if the length of the molded sample was 1 in., 2% applied strain refers to the strain required to elongate the molded sample to 1.02 in. in the direction of the applied strain. The stressed assemblies were aged in a controlled humidity environmental chamber at a temperature of about 65° C. and relative humidity of about 90% for about 24 hours. Subsequently, the assemblies were removed from the chamber and the type (B) test specimens mounted on the strain jigs were inspected for any signs of cracking or crazing. Critical strain to failure was recorded as the lowest strain level on the parabolic fixture on which cracking or crazing was observed. The results of whiteness and color stability testing are demonstrated in Table 3.

TABLE 3

| Sample No. | E5 | E1 | CE2 | E2 | E3 | CE3 | E4 |
|---|---|---|---|---|---|---|---|
| Sunscreen Chemical Resistance | | | | | | | |
| Critical Strain to Initiate Failure (%) | >2.0 | >2.0 | — | >2.0 | >2.0 | >2.0 | >2.0 |
| Tensile Properties Post Acid Treatment | | | | | | | |
| Tensile Strength (MPa) | 49.1 | 47.9 | — | 42.8 | 46.6 | — | 44.0 |
| Tensile Modulus (GPa) | 1.7 | 1.7 | — | 1.43 | 1.59 | — | 1.50 |
| Tensile Elongation at Break (%) | 120 | 120 | — | 160 | 71 | — | 97 |
| Color Data | | | | | | | |
| L* | 94.5 | 95.8 | 94.8 | 96.3 | 94.8 | 95.9 | 95.8 |
| a* | 0.11 | 0.02 | 0.17 | −0.21 | 0.04 | −0.16 | −0.13 |
| b* | −1.64 | −1.43 | −0.05 | −0.48 | −0.29 | −0.55 | −0.25 |

In Table 3, values for Critical Strain to Initiate Failure that are >2.0% indicate that there was no observable effect up to the maximum applied strain of 2.0%.

Table 3 demonstrates that samples tested had outstanding chemical resistance and outstanding whiteness and colorability. Referring to Table 3, each of samples E1-E5 had a critical strain to failure of greater than 2.0%. In general, compositions having a critical strain to failure of above 1% are regarded as having good chemical resistance performance. Furthermore, each of the samples E1-E5 had L* values of greater than about 94 in conjunction with very low chromaticity values a* and b* with only 2 phr $TiO_2$ and therefore, demonstrate the excellent whiteness and colorability of the polymer compositions.

Anodization resistance was demonstrated by acid bath immersion, as described above. In particular, the anodization process was simulated by immersing type (A) test specimens in about 70 wt % sulfuric acid at about 23° C. for 24 hours. After acid bath immersion, the test specimens were removed, washed with water and subsequently tested for their tensile properties (tensile strength at yield, tensile modulus and tensile elongation at break) according to the ASTM-D368 standard. The tensile properties before (Table 2) and after (Table 3) acid bath immersion served as an indicator of the material's ability to withstand anodization processes. As is evident from the tensile property data in Tables 2 and 3, there is very little if any degradation in the mechanical performance of the polymer compositions after exposure to harsh acidic conditions as represented by the 70% sulfuric acid solution used in these examples.

The embodiments above are intended to be illustrative and not limiting. In addition, although the present invention has been described with reference to particular embodiments, those skilled in the art will recognize that changes can be made in the form and detail without departing from the spirit and scope of the invention. Any incorporation by reference of documents above is limited such that no subject matter is incorporated that is contrary to the explicit disclosure herein.

The invention claimed is:

1. A mobile electronic device component comprising a polyester composition comprising:
   from about 20 wt. % to no more than about 80 wt. % of a semi-aromatic, semi-crystalline polyester polymer; relative to the total weight of the polyester composition;
   from 15 to 50 wt.% of an amorphous copolyester comprising recurring units ($R_{pe1}$) and ($R_{pe2}$), relative to the total weight of the polyester composition; and
   from about 1 wt. % to about 40 wt. % of a reactive impact modifier comprising acrylic ester moieties and glycidyl methacrylate moieties, relative to the total weight of the polymer composition,
   wherein the semi-aromatic, semi-crystalline polyester polymer is represented by one of the formulae (I), (II) and (III):

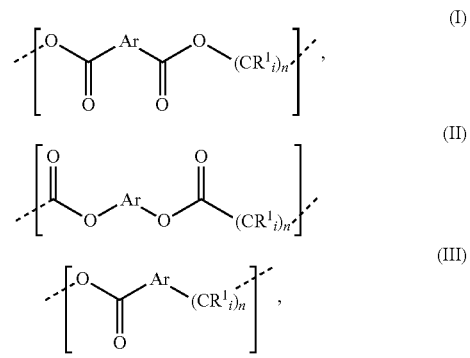

wherein:
   Ar comprises an arylene group containing at least 2 fused benzenic rings having at least two carbons in common;
   $R^1$, at each instance, is independently selected from the group consisting of a halogen, an alky, an alkenyl, an aryl, a aryl, an ether, a thioether, an ester, an amide, an imide, an alkali or alkaline earth metal sulfonate, an alkyl sulfonate, an alkali or alkaline earth metal phosphonate, an alkyl phosphonate, an amine, an quaternary ammonium, and any combination thereof;

n is an integer from 1 to 20; and i, at each instance, is an independently selected integer ranging from 0 to 2;

wherein in said amorphous polyester, recurring unit ($R_{pe1}$) is represented by the formula -[-Ma-Mb-]- recurring unit ($R_{pe2}$) is represented by the formula -[-Ma-Mc-]- wherein:

-Ma- is represented by the following formula (XIV):

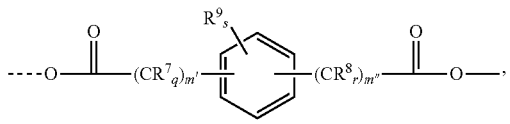

(XIV)

$R^7$, $R^8$, and $R^9$, at each instance, are independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, a quaternary ammonium, and any combination thereof;

s is an integer ranging from 0 to 4;

q and r, at each instance, are independently selected integers ranging from 0 to 2; and m' and m" are independently selected integers ranging from 0 to 20;

-Mb- and -Mc- are independently selected from the following group consisting of the following formulae:

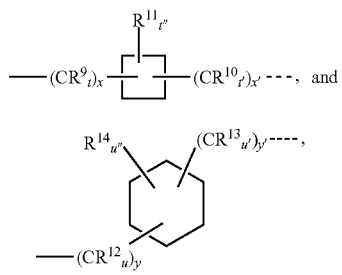

(XVI)

(XVII)

wherein $R^9$, $R^{10}$, $R^{11}$, $R^{12}$, $R^{13}$ and $R^{14}$, at each instance, is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, a quaternary ammonium, and any combination thereof;

t" is an integer from 0 to 6;

u" is an integer from 0 to 10;

t, t', u and u' are, at each instance, an independently selected integers ranging from 0 to 2; and x, x', y and y' are independently selected integers ranging from 0 to 20.

2. The mobile electronic device component of claim 1, wherein the semi-aromatic, semi-crystalline polyester polymer is represented by the formula (I):

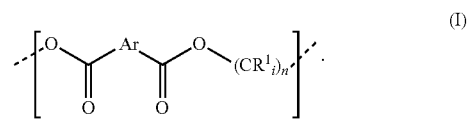

(I)

3. The mobile electronic device component of claim 1, wherein Ar comprises a naphthalate represented by the following formula (IV),

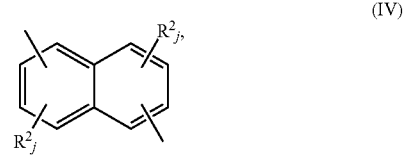

(IV)

wherein:

$R^2$, at each instance, is independently selected from the group consisting of a halogen, an alkyl, a perhalogenated alkyl, an alkenyl, a perhalogenated alkynyl, an aryl, a perhalogenated aryl, an ether, a thioether, an ester, an amide, an imide, an alkali or alkaline earth metal sulfonate, an alkyl sulfonate, an alkali or alkaline earth metal phosphonate, an alkyl phosphonate, an amine, an quaternary ammonium, and any combination thereof; and j, at each instance, is an independently selected integer from 0 to 3.

4. The mobile electronic device component of claim 1, wherein the concentration of the semi-aromatic, semi-crystalline polyester polymer is from about 20 wt. % to about 85 wt. %, relative to the total weight of the polyester composition.

5. The mobile electronic device component of claim 1, wherein the polyester composition further comprises from about 1 wt. % to about 50 wt. %, relative to the total weight of the polyester composition, of an amorphous polycarbonate polymer, and wherein the weight of the semi-aromatic, semi-crystalline polyester polymer, relative to the combined weight of the amorphous polycarbonate polymer and the amorphous polyester polymer:

$$\left( \frac{W_{semi\text{-}crystalline\ polyester}}{W_{amorphous\ polycarbonate} + W_{amorphous\ polyester}} \right)$$

is from about 1 to about 30 and where w is weight.

6. The mobile electronic device component of claim 5, wherein the polyester composition comprises the amorphous polycarbonate polymer, the amorphous polycarbonate polymer comprising recurring units ($R_{pc}$) represented by the following Formula (VI) or Formula (VII):

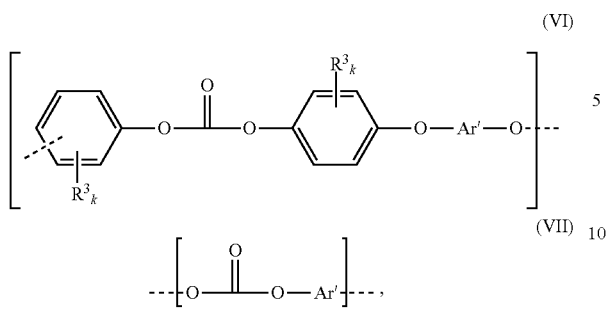

wherein:
R³, at each instance, is independently selected from the group consisting of a halogen, a $C_1$-$C_{20}$alkyl, a $C_5$-$C_{15}$ cycloalkyl, a $C_1$-$C_{20}$ alkenyl, an alkynyl, a $C_1$-$C_{20}$ aryl, a $C_1$-$C_{20}$ alkylaryl, a $C_1$-$C_{20}$ aralkyl, an ether, a thioether, caarboxylic acid, an ester, an amide, an imide, an alkali or alkaline earth metal sulfonate, an alkyl sulfonate, an alkali or alkaline earth metal phosphonate, an alkyl phosphonate, an amine, a quaternary ammonium and any combination thereof;
Ar' is an aromatic mono- or polynuclear group; and
k, at each instance, is an independently selected integer ranging from 0 to 4.

7. The mobile electronic device component of claim 6, wherein recurring unit ($R_{pc}$) is represented by Formula (VII) and wherein Ar' is represented by the following Formula (X):

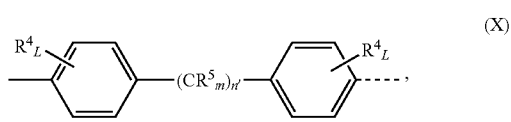

wherein:
R⁴, at each instance, is independently selected from the group consisting of a halogen, an alkyl, an alkenyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, amine, an quaternary ammonium and any combination thereof;
L, at each instance, is an independently selected integer ranging from 0 to 4;
R⁵, at each instance, is independently selected from the group consisting of a halogen, an alkyl, a perhalogenated alkyl, an alkenyl, a perhalogenated alkynyl, an aryl, a perhalogenated aryl, an ether, a thioether, an ester, an amide, an imide, an alkali or alkaline earth metal sulfonate, an alkyl sulfonate, an alkali or alkaline earth metal phosphonate, an alkyl phosphonate, an amine, an quaternary ammonium, and any combination thereof;
n' is an integer from 1 to 20; and
m, at each instance, is an independently selected integer ranging from 0 to 2.

8. The mobile electronic device component of claim 5, wherein the amorphous polycarbonate polymer further comprises recurring units ($R_{pc}$*) represented by the following formula:

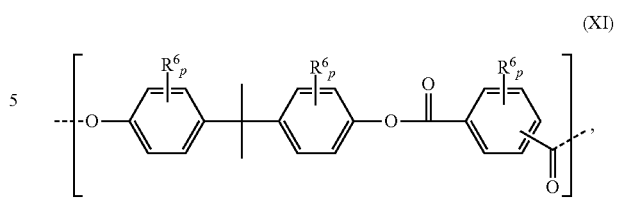

R⁶, at each instance, is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, amine, a quaternary ammonium and any combination thereof; and
p, at each instance, is an independently selected integer ranging from 1 to 4.

9. The mobile electronic device component of claim 1, wherein the reactive impact modifier has a concentration of from about 5 wt. % to about 30 wt. %, relative to the total weight of the polyester composition.

10. The mobile electronic device component of claim 1, wherein the reactive impact modifier has a concentration of from about 10 wt. % to about 25 wt. %, relative to the total weight of the polyester composition.

11. The mobile electronic device component of claim 1, wherein the polymer composition comprises a notched Izod impact resistance of at least about 700 J/m, as measured on 0.125 inch thickness specimens according to the ASTM D256 standard.

12. The mobile electronic device component of claim 1, wherein the polyester composition has an average mold shrinkage of from about 0.6% to about 0.99% and an anisotropy of shrinkage from about 0.86 to about 1.

13. A mobile electronic device comprising the mobile electronic device component of claim 1, wherein the mobile electronic device is selected from the group consisting of a mobile phone, a personal digital assistant, a laptop computer, a tablet computer, a wearable computing device, a smart watch, smart glasses, a camera, a portable audio player, a portable radio, a global positioning system receiver, and portable game console.

14. A mobile electronic device component comprising a polyester composition comprising:
from about 20 wt. % to no more than about 80 wt. % of a semi-aromatic, semi-crystalline polyester polymer, relative to the total weight of the polyester composition;
from about 1 wt. % to about 40 wt. % of a reactive impact modifier comprising acrylic ester moieties and glycidyl methacrylate moieties, relative to the total weight of the polyester composition; and
from about 15 wt. % to about 50 wt. % of an amorphous polyester polymer or a combination of an amorphous polyester polymer and an amorphous polycarbonate polymer, relative to the total weight of the polyester composition;
wherein the amorphous polyester is a copolyester comprising recurring units ($R_{pe1}$) and ($R_{pe2}$):
wherein:
recurring unit ($R_{pe1}$) is represented by the formula
-[-Ma-Mb-]-
recurring unit ($R_{pe2}$) is represented by the formula
-[-Ma-Mc-]- wherein:
-Ma- is represented by the following formula (XIV):

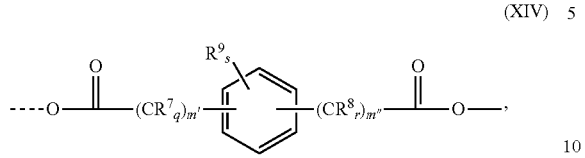
(XIV)

$R^7$, $R^8$, and $R^9$, at each instance, are independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, a quaternary ammonium, and any combination thereof;

s is an integer ranging from 0 to 4;

q and r, at each instance, are independently selected integers ranging from 0 to 2; and m' and m" are independently selected integers ranging from 0 to 20;

-Mb- and -Mc- are independently selected from the following group consisting of the following formulae:

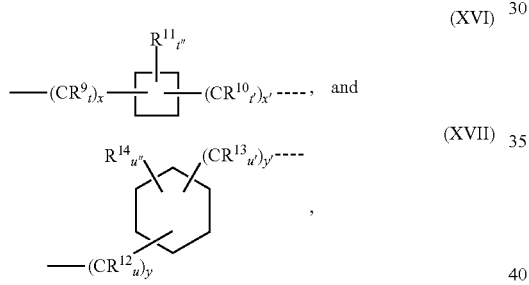
(XVI)

(XVII)

wherein
$R^9$, $R^{10}$, $R^{11}$, $R_{12}$, $R^{13}$ and $R^{14}$, at each instance, is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, a quaternary ammonium, and any combination thereof;

t" is an integer from 0 to 6;

u" is an integer from 0 to 10;

t, t', u and u' are, at each instance, an independently selected integers ranging from 0 to 2; and x, x', y and y' are independently selected integers ranging from 0 to 20.

15. The mobile electronic device component of claim 14, wherein the semi-aromatic, semi-crystalline polyester polymer is represented by one of the formulae (I), (II) and (III):

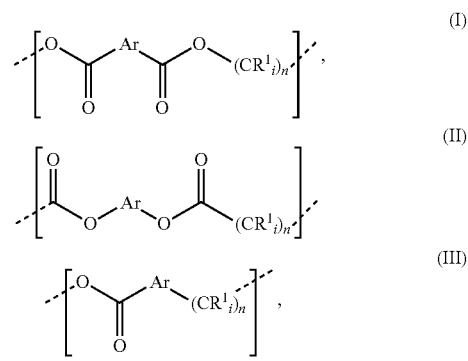

wherein:
Ar comprises an arylene group containing at least 2 fused benzenic rings having at least two carbons in common;

$R^1$, at each instance, is independently selected from the group consisting of a halogen, an alky, an alkenyl, an aryl, a aryl, an ether, a thioether, an ester, an amide, an imide, an alkali or alkaline earth metal sulfonate, an alkyl sulfonate, an alkali or alkaline earth metal phosphonate, an alkyl phosphonate, an amine, an quaternary ammonium, and any combination thereof;

n is an integer from 1 to 20; and i, at each instance, is an independently selected integer ranging from 0 to 2.

16. The mobile electronic device component of claim 14, wherein the reactive impact modifier has a concentration of from about 10 wt. % to about 25 wt. %, relative to the total weight of the polyester composition.

17. The mobile electronic device component of claim 14, wherein the polyester composition has:
a notched Izod impact resistance of at least about 700 J/m, as measured on 0.125 inch thickness specimens according to the ASTM D256 standard; and/or
an average mold shrinkage of from about 0.6% to about 0.99% and an anisotropy of shrinkage from about 0.86 to about 1.

18. A mobile electronic device comprising the mobile electronic device component of claim 14, wherein the mobile electronic device is selected from the group consisting of a mobile phone, a personal digital assistant, a laptop computer, a tablet computer, a wearable computing device, a smart watch, smart glasses, a camera, a portable audio player, a portable radio, a global positioning system receiver, and portable game console.

* * * * *